E. CLARK.
Mill Spindle.
No. 18,234.
Patented Sept. 22, 1857.
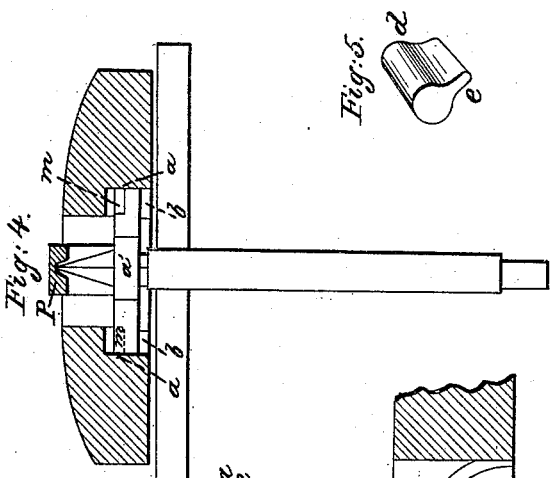
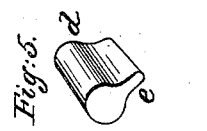
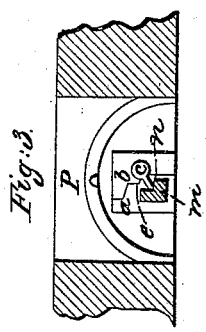
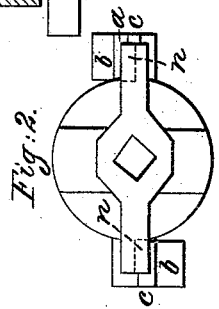
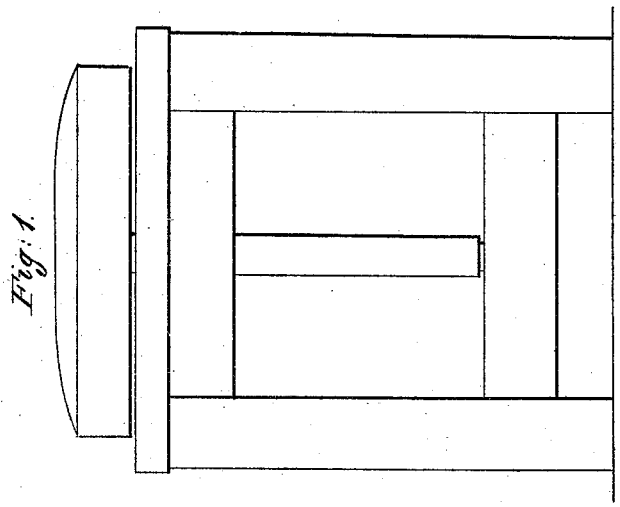

UNITED STATES PATENT OFFICE.

EDWIN CLARK, OF LANCASTER, PENNSYLVANIA.

BEARING FOR MILLSTONE-DRIVERS.

Specification of Letters Patent No. 18,234, dated September 22, 1857.

*To all whom it may concern:*

Be it known that I, EDWIN CLARK, of Lancaster, in the county of Lancaster and State of Pennsylvania, have invented an Improved Bearing for Millstone-Drivers, and that the following is a full, clear, and exact description of the principle or character which distinguishes it from all other things before known and of the usual manner of making, modifying, and using the same, reference being had to the annexed drawings, of which—

Figure 1 represents a front view of the machine; Fig. 2, a detached view of the driver and bearings; Fig. 3, a transverse section of the driver and bearing block; Fig. 4, a section through the upper stone showing the interior arrangement; Fig. 5, the rocking bearing C.

My invention consists in an improvement in the bearings for drivers for mill stones set forth as follows:

Within a suitable recess or cavity in the upper stone $a$ I insert a metallic bearing block $b$, in which is held the rocking bearing $c$ constructed as follows: This bearing consists of a cylindrical portion $d$ and a wing portion $e$. The cylindrical portion is inserted in a suitable cavity or box in the bearing block and turns in this box to the extent of the opening or slot $n$ through which the wing portion projects. On opposite faces of the extremities of the mill driver $a'$ are recesses $m$ $m$ to receive the bearing edges of the wing portion of the rocking bearing $e$.

When the stone and drivers are set up and in place it will be seen that as the shaft revolves the driver presses upon the edges of the rocking bearings and the combined action of the rocking bearings and the pivot bearing P gives the advantages of a universal joint in regulating the running of the stones, while the construction is more economical and efficient. Sufficient space is left on either side of the driver to admit of its various positions in the rising and falling of the stone from obstructions or disturbing causes.

What I claim as my invention is—

The rocking bearing consisting of a cylindrical portion $d$ inserted within a cavity in the bearing block $b$, and a wing portion $e$ passing through a slot in said bearing block, in combination with the bearing recess $m$ in the driver as set forth.

EDWIN CLARK.

Witnesses:
R. T. CAMPBELL,
CHAS. G. PAGE.